Sept. 21, 1948.   R. JONES   2,449,705
SOUND PICTURE MAGAZINE PROJECTOR OF
THE CONTINUOUSLY MOVING FILM TYPE
Filed Nov. 14, 1944   4 Sheets-Sheet 1

RICHARD JONES,
INVENTOR.

BY

ATTORNEY

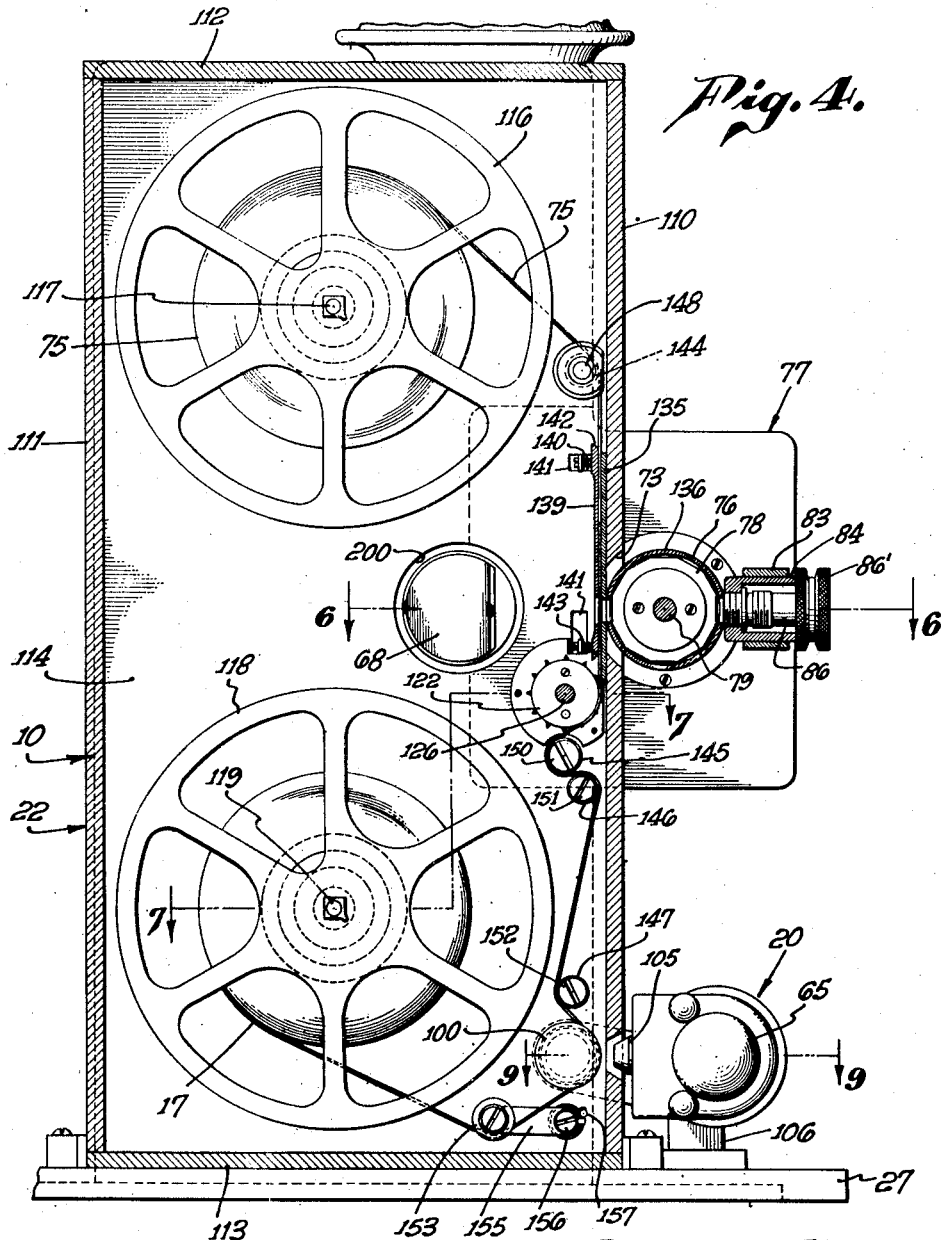

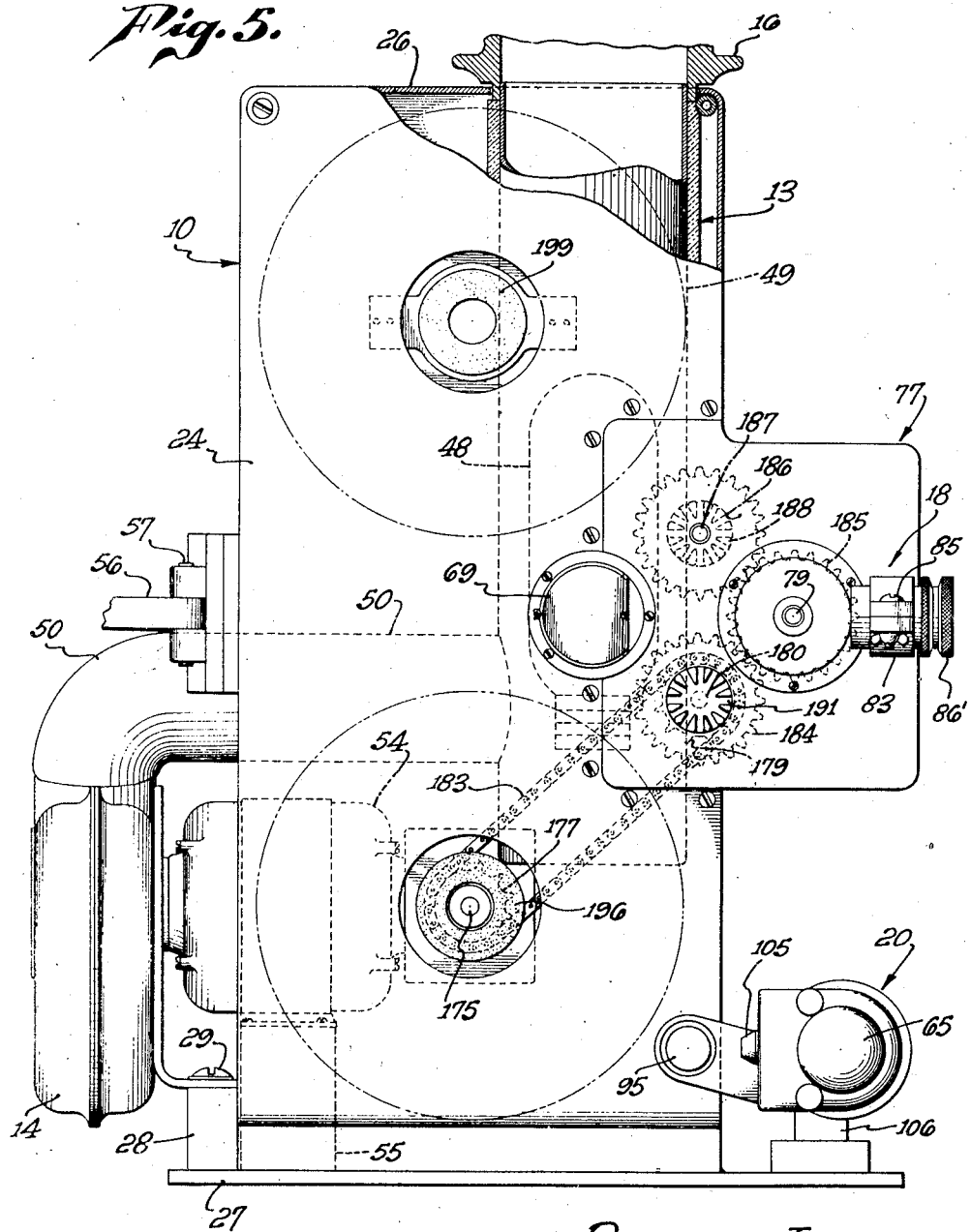

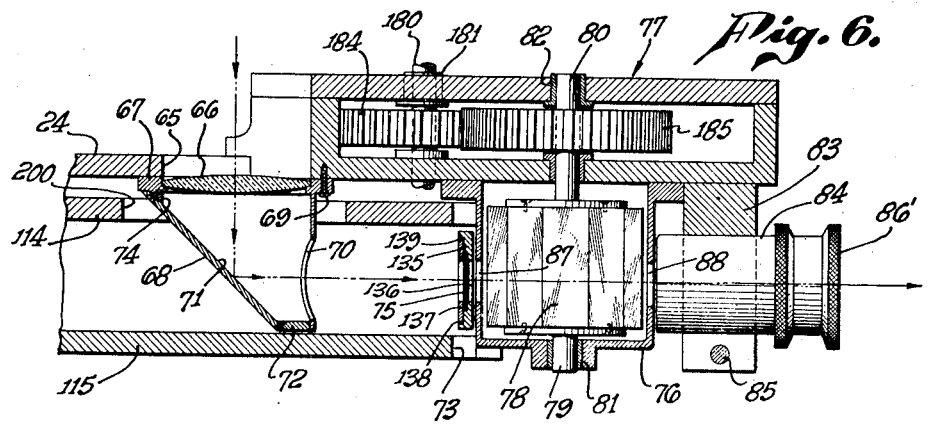
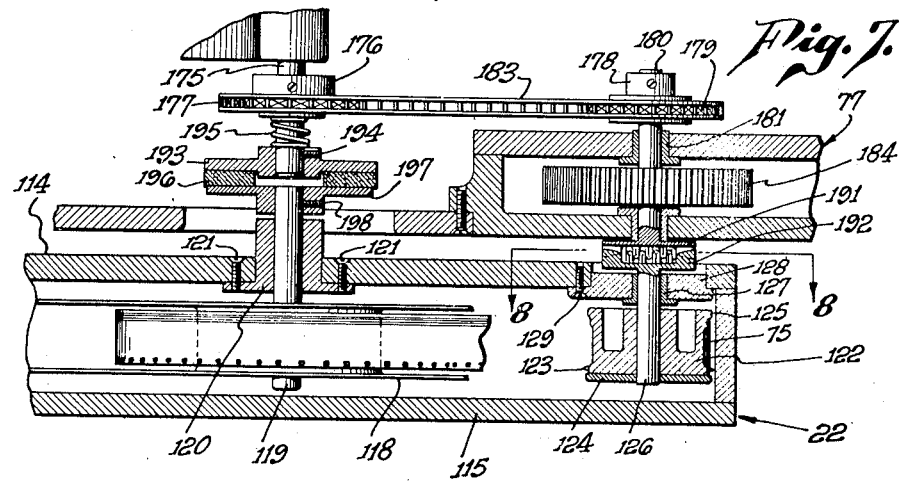
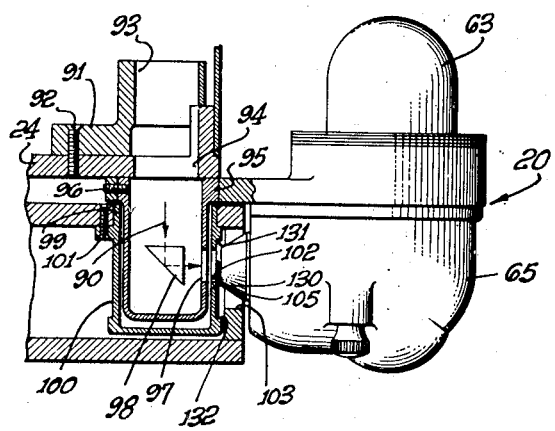
Richard Jones,
INVENTOR.

Patented Sept. 21, 1948

2,449,705

UNITED STATES PATENT OFFICE 2,449,705

SOUND PICTURE MAGAZINE PROJECTOR OF THE CONTINUOUSLY MOVING FILM TYPE

Richard Jones, Burbank, Calif., assignor to Walt Disney Productions, Burbank, Calif., a corporation of California Application November 14, 1944, Serial No. 563,381

16 Claims. (Cl. 88—16.2)

My invention relates to moving picture equipment and has particular reference to a projecting machine adapted to project both pictures and sound.

Among the objects of my invention is to provide a new and improved composite unitary motion picture projector adapted to cooperatively receive a film magazine which can be attached as a unit to a stationary portion of the projector without it being necessary to thread film or make any mechanical adjustments other than the act of clamping the magazine in place.

Another object of my invention is to provide a magazine containing reels for film for a motion picture projector so arranged that the magazine includes not only a pressure plate but also a drive sprocket for the film so arranged that the device can be threaded with film before it is attached to a projector, the magazine being so set up that the reel containing film to be projected is at one end and the empty reel is at the other end but wherein the film is actually connected to the empty reel so that as soon as operation is started the film will wind upon the empty reel within the magazine.

Still another object of my invention is to provide a magazine loading device for motion picture projectors arranged so that a number of magazines can be loaded with reels of film designed to be projected in succession, it being only necessary to attach the magazines one at a time to a stationary part of the projector and remove the entire magazine when the film has been run completely from the reel so that it can be replaced with another, it being also contemplated that the stationary housing be provided with a rewinding mechanism so that after the first magazine has been run it can be clamped to another part of the stationary projector and rewound preparatory to a new showing while the projector is being run to show the film in a second magazine.

Another object still is to provide a magazine for the film reels designed to be operated by a source of power in a stationary part of the projector with connections on the magazine such that they need only be pressed into surface contact with corresponding connections in the housing in order that the source of power within the housing can be used to operate all of the mechanical moving parts in the magazine.

A further object of my invention is to provide for a motion picture projector a stationary housing containing sources of light for projection of pictures and reproduction of sound and adapted to be used with a magazine containing film, arranged so that the film is continuously maintained within the magazine at all times, the object being also to prepare a machine such that the light which is directed outwardly from the housing and into the magazine is only the useful beam of light necessary for projecting and reproducing purposes thereby making it possible to confine heat generated by the sources of light within the stationary part of the housing so that the contents of the magazine will not be heated up unnecessarily.

A further object still is to provide a magazine for motion picture projectors in which the film is unwound and run at a constant speed designed to be used in company with a prism for properly showing successive frames of pictures on a screen, the clutch for connecting the means for driving the film and the power means in the stationary housing being so arranged that whenever the clutch is engaged a picture frame will always be in proper register with a face of the prism whereby no adjustment is necessary in order to have the picture frame in proper register with the mechanism for separating frames of pictures one from the other as they are projected in succession on the screen.

Another object of my invention is to provide a unitary magazine fed motion picture projector wherein a stationary portion of the device contains the operating elements in the nature of light sources, power source and projecting system for both pictures and sound all of which when once adjusted retain their adjustment so that only the magazine containing successive reels of pictures to be shown need be changed by means of the simple operation of removing one magazine and replacing it with another thereby making unnecessary any further adjustment for any of the working parts of the device.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 4 is a longitudinal sectional view of the upper portion of the device taken through the magazine and the projection lens system and drawn to larger scale.

Fig. 5 is a side elevational view partly in section of the upper portion of the device showing the chain and gear drive in dotted position.

Fig. 6 is a partial cross-sectional view through the lens-projecting system taken on the line 6—6 of Fig. 4.

Fig. 7 is a cross-sectional view of the drive sprocket mechanism and reel tensioning means taken on the line 7—7 of Fig. 4.

Fig. 8 is a fragmentary view of the side of the magazine as seen on line 8—8 of Fig. 7 showing one face of a clutch for the drive sprocket; and Fig. 9 is a partial cross-sectional view taken through the sound projection portion on the line 9—9 of Fig. 4.

Figure 1:
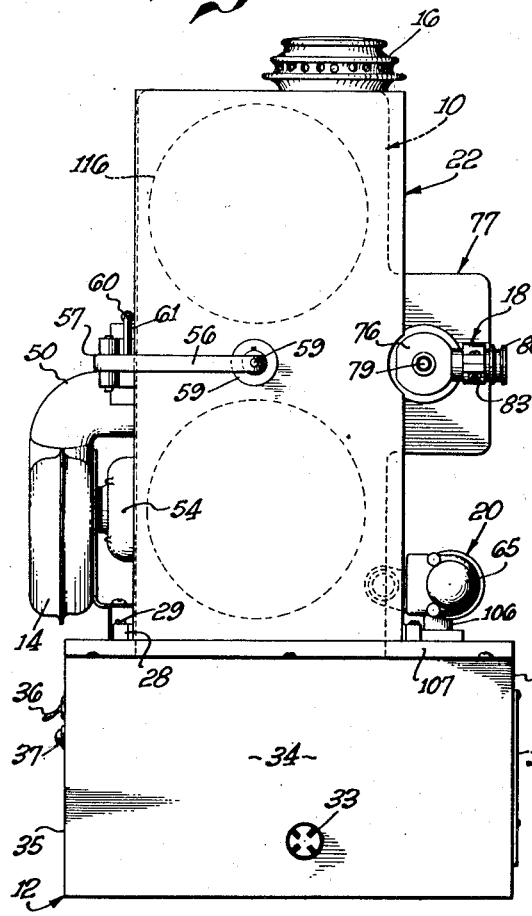
Fig. 1 is a side elevational view of the device set up and ready for the projection of a picture.

The invention is particularly directed to a simple, effective and fool-proof projector which can be used by the layman or child for entertainment, educational or sales purposes.

Prior projectors, even the simplest forms accommodating 8 and 16 mm. film, require careful threading of the film through the driving mechanism. When both sound and picture are projected, the film normally moves intermittently through the picture projection gate and continuously through the sound reproducing head. The film is fed from one separate reel or magazine into another reel or magazine. Often the film is inserted in an inverted position. Film handled by inexperienced operators is often scratched and torn.

The present invention obviates handling of the film, since the film is always retained within a light-weight, virtually dust-proof magazine. The projector is simply and inexpensively constructed and is therefore well adapted for use in schools and offices as well as in homes and theaters. The film is preferably driven continuously, both during picture projection and sound reproduction. The life of the film is prolonged and the magazines containing the film may be shipped wherever a projector adapted to receive them is available.

As motion pictures come more and more into common use and are shown widely before groups in schools, clubs, institutions and the like a great variety of people will be called upon to operate them. Motion picture projectors as they have been constructed in the past have needed a certain amount of adjustment every time a picture is projected. It has meant the threading of a film through various spools and sprockets adjusted so that a film is in proper register and so that it winds properly as it is run from one reel to another. It has also been necessary to rewind a reel after each showing. When pictures are to be projected before small groups where there might not be present a person familiar with the usual projection equipment it becomes necessary either to engage someone familiar with equipment or to give special directions at the time to a person unfamiliar with that equipment.

If motion picture film is to be widely distributed among groups of people who do not have the mechanical ability to operate projection machines, it becomes necessary to simplify the placing of a reel of film in the machine so that it can be performed by persons entirely unfamiliar with the mechanical details of the mechanism.

This invention contemplates the use of a magazine for the reel of film so arranged that it needs only to be applied against the outside of a stationary housing and there held in place. The type of device needed is one so constructed that the magazine can be placed in only one position wherein all of the operating parts will be automatically connected to it without it being necessary for the operator to do anything more than to press the magazine into its place in the only position where it fits and to there secure it by use of a simple spring-pressed clamp. In view of the necessity for keeping the structure of the magazine as simple as possible it has been found advisable to incorporate into it certain of the parts which would be normally a part of the projector but in the embodiment illustrated these parts have been kept substantially to a minimum so that excess duplication has been eliminated.

In the embodiment chosen to illustrate my device there has been provided a stationary housing 10 which is shown mounted upon a cabinet 12 designed to house sound equipment. The stationary housing is provided with a ventilating unit 14 containing a fan which blows air through a lamp chamber 13 and out through a stack 16 for carrying off the intense heat generated by the lamp when in operation. On the stationary housing there is provided a projection device 18 for throwing motion pictures on a screen and a sound pickup 20 enclosed in a casing adapted to synchronize the sound track with the picture and reproduce it within the cabinet 12.

Separate magazines 22 are provided and are equipped with the necessary reels of film and guides for the film so that one magazine may be clamped to the stationary housing in position behind the projecting mechanism 18 and the other can be applied to the housing on the opposite side so that when desired a projected film may be rewound while a second reel is being projected. There may be any number of magazines 22 all identical in shape and construction but merely loaded with a different film. The magazines are interchangeable so that they can all be shown from the same projection position and likewise all rewound at the rewind position.

The stationary housing consists essentially of a front wall 23, side walls 24 and 25, a top 26 and a bottom 27 designed to rest upon and be secured to the cabinet 12 in order to attach the housing to the cabinet. There are provided a set of bosses 28 designed to receive screws 29 which are driven through the bottom of the housing and into appropriately threaded holes of the cabinet 12.

The cabinet is also provided with a front wall 30 within which is an opening 31 covered by a screen 32 through which sound generated in the cabinet passes outward. A tuning dial 33 is located in the side of the cabinet and operates in a conventional manner to control the volume of sound emitted by the cabinet. The cabinet is provided with side walls 34 and a rear wall 35 upon which is mounted a switch 36 for turning the mechanism on and off and a telltale light 37. The stationary housing is further provided with a conventional power means consisting of a motor 54 with connecting shafts for providing the power which operates the projection machine. Similarly the housing is provided with a conventional light source, details of which have been omitted except to show a light bulb 48 positioned so that light may be projected from it laterally outward from the housing to the proper portion of the magazine. The light bulb is shown in the lamp chamber 13 which is connected by means of a conduit 50 to the fan unit 14 so that air for cooling may be blown around the bulb and then upwardly through the vent at the top so that heat from the light source will not accumulate in the housing. The motor 54 comprising the source of power is mounted upon a block 55 and is so positioned that the motor is adapted to drive not only the ventilating fan but also is used to supply power for operating the projecting mechanism.

In order to hold the magazines 22 in place upon the stationary housing there is provided a pair of clamping devices consisting respectively of L-shaped arms 56 and 56' secured by means of hinges 57 and 57' to the rear wall of the stationary housing. At the other end of each clamp is a threaded stub shaft 58 which has a threaded engagement with the end of the arm. At the end of the threaded stub shaft is a shoe 59 which bears directly against the magazine. The stub shaft can be threaded into or out of the end clamp so that it moves the end of the clamp close to or away from the shoe.

When an adjustment is to be made some conventional locking means may be provided to fix the setting of the shoe at the end of the arm 56. The shoe is pivotally attached to the threaded stub shaft by means of a pin 62. As shown in this embodiment the arms 56 and 56' are both urged into a clamping position by means of a single coiled spring 60 which is attached by means of a pin 61 to each of the arms.

Light for projecting a picture upon a screen is generated in the lamp 48 in the housing and passes outwardly as shown by the arrows in Fig. 6 into the magazine and thence through the projecting mechanism toward the screen. To provide a path for the light the housing wall 24 is provided with an opening 65 defining a channel and in the opening a lens 66 is mounted and is attached to the side of the housing by means of a frame 67. The frame together with a lid 68 forms a cap for closing the opening 65, the cap being attached to the wall by means of screws 69. There is an opening 70 on one side of the cabinet for permitting light to emerge and it should be noted that the lid 68 has a reflecting surface 71 which, when positioned as shown at an angle of 45° to the path of light emerging from the housing, is capable of redirecting the beam of light from the housing through the opening toward the lens system. The cap is provided further with a flat top 72 which forms, together with a molding 74, a means for attaching the lid 68.

At the front edge of the magazine is an aperture 73 forming a location for a suitable mounting means, details of which will be subsequently described.

A motion picture film 75 is shown in the path of light and it is from this film that the projection is made upon the screen. Included in the projecting lens system is a prism housing 76 which is secured to an extension 77 at the front of the stationary housing. Within the prism housing is a symmetrical 12-sided prism 78 mounted upon stub shafts 79 and 80 which are held respectively in bearings 81 in the prism housing and 82 in the wall of the extension 77 so that the prism rotates upon a horizontal axis. It is so arranged that the 12 faces are in pairs parallel to each other as can be seen in Fig. 4.

On the side of the prism opposite from the motion picture film there is provided a lens mounting 83 in which a tube 84 is secured and held in place by means of a set screw 85. The tube contains a telescoping threaded tube 86 having a mounting 86' for additional lenses for properly focusing the light upon the screen. It should also be noted that the prism housing is provided with a light inlet passage 87 and an outlet passage 88 by means of which light passes into the housing and prism and then out the other side.

A second source of light not shown is used for sound reproduction, this being located near the bottom of the stationary housing. Light for the reproduction of sound follows the path of arrows 90 as shown in Fig. 9. To properly control the passage of light for the sound projection system from the stationary housing outwardly to the sound pickup and amplifying systems there is provided a block 91 attached by means of screws 92 to the inside of the side wall 24 and this block is provided with a passage 93 defining a channel. Light emanates from an electric lamp in a reflector 63 which is connected through wires 64 to a power line in the stationary housing. The housing is provided with a cover 65, held in place by means of screws 65'. A passage 94 in the wall of the stationary housing is in alignment with the first-named passage. A bonnet 95 is secured in place by means of set screw 96 upon the side wall of the stationary housing, the bonnet forming a hollow pocket throughout its length. At the front wall of the pocket is an opening 97 and within the bonnet a triangular prism 98 is mounted in such a manner that a beam of light coming from the housing can be redirected outwardly from the bonnet through the opening 97.

The magazine is provided with an opening 99, and set in the opening is a jacket 100 which is secured by means of screws 101 to the adjacent wall of the magazine. The jacket has a cavity sufficiently large so that the bonnet fits freely within it. The inside of the bonnet is likewise provided with an opening 102 in registry with the opening 97 so that light emerging from the housing can be passed freely to the sound pickup.

The magazine case is further provided with an opening 103 and the sound pickup device 20 has a collecting horn 105 extending into the opening 103 and adapted to receive light which is passed outwardly through the magazine in the manner just described. The sound pickup device may be of conventional construction and in this embodiment is shown mounted upon the bottom 27 of the stationary housing by means of a pedestal 106 through which the sound pickup device connects with an amplifying system within the cabinet 12.

The reel carrying magazine is in the form of a substantially rectangular casing consisting of a front wall 110, a rear wall 111, a top 112 and a bottom 113 which defines a large rectangle. A plate 114 closes one side of the rectangular area and a plate 115 closes the other side. The plate 114 serves as a mounting for the various moving parts of the device whereas the plate 115 acts as a lid or cover for the casing.

Within the casing on the upper side of the plate 114 a reel 116 is mounted and is designed to carry the film which is to be projected. The reel has a shaft 117 by means of which it is mounted upon the plate. A second reel 118 is located in the lower portion of the casing and this reel is provided with a shaft 119. The shaft is journaled to a bearing 120 which is screwed to the plate 114 by screws 121. A similar bearing is provided for the reel 116. The reel in each case is keyed to its respective shaft and the shaft is so mounted that it freely rotates in the bearing provided for it.

In order to draw the film from one reel and pass it on to the other there is provided a drive sprocket 122 upon which is a series of teeth 123 designed to engage perforations at the side of the film. A cap 124 is positioned on the drive sprocket and provides a flange which aids in locating the film upon the sprocket. A bead 125 is located on the side opposite the flange so that there is a space between the bead and the flange which is slightly wider than the width of the film which is to be run over the sprocket.

For mounting the drive sprocket there is provided a shaft 126 which extends through a bearing 127 held in a bushing 128 which is in turn held by screws 129 to the wall 114 on the inside of the casing. A second guide for the film is incorporated into the jacket 100 and is best seen in Fig. 9. The guide consists of a recess in the jacket on the right-hand side as viewed in Fig. 9 and within the recess is a skid 130 over which the film may slide. The recess provides a shoulder 131 on one side and a shoulder 132 on the other side between which the film is confined and by means of which it is locked with respect to the openings 102 and 97.

In order to lock the film properly as it passes the projection aperture there is provided a metal plate 135 which is secured to the wall 110 of the case in a position such that it closes the aperture 73 in the wall. The plate is provided with a projection opening 136 which is approximately the size of a frame of a picture appearing on the film. The projection opening is in alignment with the respective faces of the 12-sided prism as they rotate to a point parallel with the plate 135. Within the plate 135 is a recess 137 slightly wider than the width of the film and this recess forms a channel past the projection opening. The channel is enlarged at the points 138 and within this enlargement is positioned a pressure gate 139 which is held in the channel by spring-pressed pins 140 which in turn are mounted by means of brackets 141 on the plate 114. It should be noted that the upper end 142 and the lower end 143 of the pressure gate are filleted in order to provide a smooth round surface instead of a corner to prevent damage to the film in its passage.

To further guide the film as it travels through the operating parts of the magazine there are provided a series of idler spools 144, 145, 146 and 147. The uppermost spool consists of a shaft 148 secured upon the plate 114 upon which the spool is mounted for guiding the film. Shafts 150, 151 and 152 are mounted upon the plate 114 and support similar rotating sleeves which are grooved to hold and position the film during its passage. An idler spool 153 is shown in the bottom of the magazine casing in Fig. 4 and is mounted upon an arm 155 which is secured by means of a shaft 156 to the plate 114. In this case there is provided a spring 157 so mounted that it tends to rotate the spool 153 and the arm 155 in a counterclockwise direction about the shaft 156. This tends to press the film downwardly at this point and maintains a slight tension upon it.

It should be noted that the idler spool 144 g ues the spring into position adjacent the p ssure gate and that the idler spool 145 tends t pres the spring into contact with the drive s rocket and the teeth therein. The idler spools 1 7 and 153 tend to hold the film in place upon the jacket 100.

As previously related, power for operating the device comes from the electric motor 54 visible in the lower portion of Fig. 5. To drive the drive sprocket a shaft 175 extends laterally from the motor as illustrated in Fig. 7. Upon the shaft is a collar 176 which is used for securing a sprocket 177 to the shaft. Another collar 178 is used to secure a driven sprocket 179 to a stub shaft 180, this shaft being journaled in a bearing 181 at one side of the housing extension 177 and a bearing 182 at the other side of the housing extension. A chain 183 connects the sprockets 177 and 179 which, being of the same size, are in a one to one ratio. Also secured to the stub shaft is a large sprocket 184 having teeth thereon which mesh with a sprocket 185, best seen in Figs. 5 and 6. The sprocket 185 is keyed to the shaft 80 previously described which is journaled in the housing extension 77 immediately above and slightly to the right of the sprocket 184 as viewed in Fig. 5. The stub shafts 79 and 80 have been previously noted as attached to the prism and rotate with the prism when in operation.

To supply a take-off of power from the power means to the drive sprocket there is provided an open-faced gear clutch comprising a clutch element 191 attached to the shaft 180 and a similar clutch element 192 attached to the shaft 126 of the drive sprocket previously described. It will be apparent therefore that the chain drive and the sprocket drive are both at a one to one ratio and that the speed of the drive sprocket spindle will be the same as the speed of the prism and both will be rotated at the same speed as the motor shaft 175. The reels for film are both rotated in order that the film may be constantly maintained relatively taut and so that no loops will accumulate as the device continues to operate.

A rewind sprocket 186 is also driven from the sprocket 185 and this is mounted upon and drives a shaft 187 to which an open-faced gear clutch element 188 is attached at the opposite side of the stationary mounting.

In order to provide a proper drive connection for the film reel a clutch disc 193 is attached to the motor shaft 175 by means of a set screw 194 which slides in an axial groove (not shown) in the shaft. A coiled spring 195 is provided between the clutch disc and the sprocket 177 which continuously tends to urge the clutch disc in an outwardly direction. The clutch disc has a friction material 196 on the face to provide a friction drive between the first clutch face 196 and a second clutch face 197. The second clutch face 197 is non-rotatably attached by means of a set screw 198 to the reel shaft 119, this being the lower of the two reels. The upper reel 116 is provided with a similar clutch disc 199 attached to its shaft 117 and a similar friction faced clutch disc is provided in the upper portion of the stationary housing which is operated from the motor at a similar speed. Inasmuch as the clutches are friction clutches and the elements are pressed only lightly together by means of a coiled spring there is provided a slip drive such that when one reel or the other is placed under tension the clutch will be permitted to slip and thereby maintain the tension but without placing such a strain on the film as would break it.

In the wall 114 of the magazine there is provided an opening 200 which is of a size slightly larger than the cap by means of which light is admitted to the magazine behind the film. The opening 99 for the bonnet 95 lies in the wall 114 of the magazine at a lower point.

In operation when it is desired to project a film which is loaded in one of the magazines the magazine with the loaded reel of film uppermost is pressed against the stationary housing and there held in place by means of one of the arms 56. As the magazine is pressed against the housing the clutch disc 97 will press against the face of the clutch disc 193 and the clutch disc 199 will press against a corresponding face of an upper clutch disc in the housing. Both of these clutch discs in the housing are driven at a constant rate of speed by the motor. While the sprocket 177 is rotating the sprocket 179, the sprocket 184 and the sprocket 185 all continue to rotate at the same speed. The power thus applied enables the drive sprocket to rotate and draw film off the upper loaded reel and advance it past the projection opening and downwardly over the appropriate idler spool to a point where it is taken up and reeled upon the lower reel.

By reason of the fact that there is a substantial thickness to the quantity of film which builds up on the reels the rate at which film leaves one reel and is taken up by the other will vary, although the rotation of the reel will continue at a constant speed. The drive sprocket however fixes the rate at which the film travels and the difference between that and the circumferential speed of the wound film at any one time is enough to hold the film taut.

The clutch element 192 engages face to face with the open face of a second clutch element and by reason of these two clutch discs having the same number of teeth as there are faces on the prism there will always be perfect cooperation between operation of the prism and the drive sprocket. The prism shaft will always be driven not only at the same rate of speed but also will bear the same relationship with respect to the drive sprocket. This means that since the number of teeth on the clutch disc are calculated in order to present one complete frame of pictures for each position of the clutch teeth there will be one complete frame of pictures in place in the projecting aperture whenever one of the flat faces of the prism is in parallel relationship with the film. This is accomplished by having the clutch teeth of a predetermined number corresponding to the number of prism faces and having them mesh precisely one with another. This portion of the device is one which has been substituted for the conventional intermittently operated shutter coupled with a means for advancing the film step by step instead of at a continuous rate of speed.

As the drive sprocket continues to draw film from the loaded reel past the projection aperture and send it down to the lower portion of the magazine, both reels are rotated so that respectively they help carry the film to and away from the sprocket. Because of the fact that the film piles up on itself on the reel the actual speed of travel of the film would vary if permitted. In that event there might be a loop formed on one side or other. To obviate this the film reels are positively driven through the friction clutch so that when tension grows, due to the fact that there is a large body of film on a reel, the clutch will slip thereby preventing the film from breaking.

In the film to be used in the device in question, there is customarily provided a sound track. In order to properly operate a sound track it is found preferable to project a separate and distinct stream of light against it. This is accomplished by passing a stream of light through the passage 93, the prism 98 and thence outwardly and through the aperture adjacent the sound reproducing means.

The sound reproducing means is of relatively conventional design and is enclosed in the casing 20 which is provided with a collecting horn 105 so positioned with relation to the position normally occupied by the magazine that the horn is in alignment with the beam of light passed through the sound track. The casing 20 which houses necessary sound pickup elements stands on the pedestal 106. Light for operating the sound track comes outwardly through the passage 93, is then bent at right angles by the prism 98, and from there passes through the sound track portion of the film from which it enters the sound pickup. From the pickup it is carried by a conventional wiring system into the cabinet 34 where it is amplified for projection in synchrony with the projection of the film.

After all of the film has been run off the upper reel and onto the lower reel it is then necessary only to loosen the clamp arm and remove the entire magazine. A new magazine can be applied containing a new load of film on the upper reel and, since the necessary clutch faces are immediately engaged, the new magazine is ready for projection. The picture projecting aperture will be again in precise alignment as will also be the aperture for the light beam from the sound track.

Figure 2:
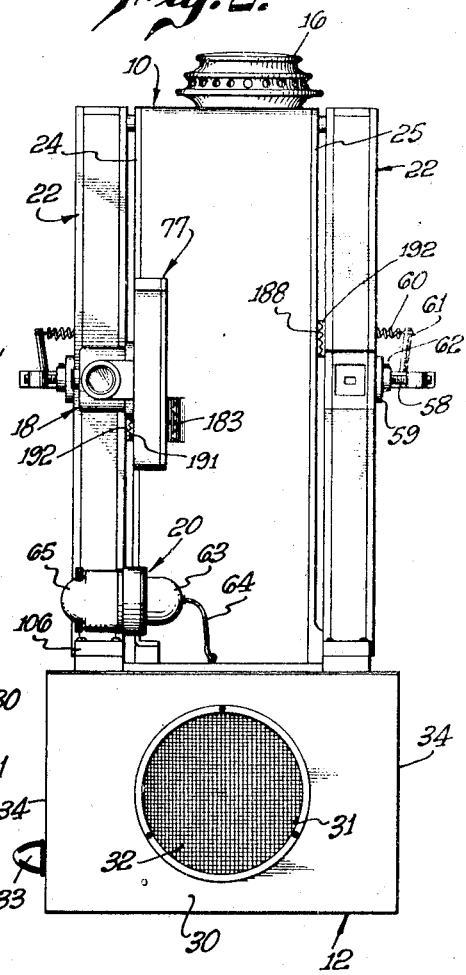
Fig. 2 is a front elevational view of the device shown in Fig. 1.
Figure 3:
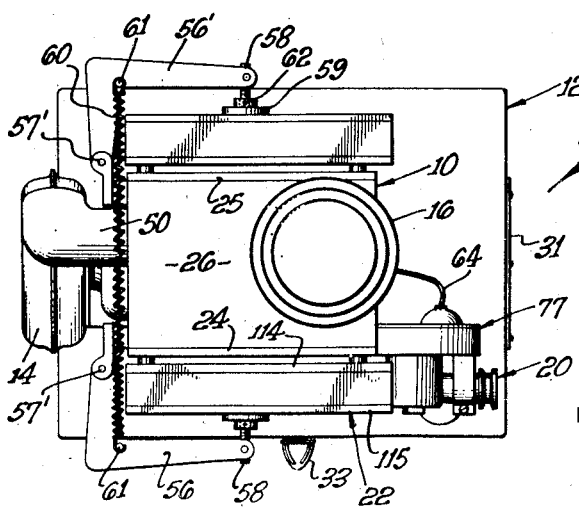
Fig. 3 is a plan view of the device shown in Fig. 1.

As the new magazine of film is run off, the magazine containing the film just projected can be rewound. In order to do this, the magazine is applied against the opposite side of the stationary housing as shown in Fig. 2. It is then pressed in place against the clamp arm 56. It is necessary only that the magazine be inverted so that the reel containing the film which has already been projected is on top, with the empty reel on the bottom. The picture projecting aperture will continue to face the front of the device. Suitable clutch discs driven by the motor are positioned on the face of the stationary housing for engagement with the clutch discs driving the film reels. Since the clutch discs which drive the reels in the magazine on both sides are on the same shaft they naturally rotate in the same direction. In so doing they rotate the shaft of the film reels in such a direction that the film is rewound upon the reel which originally held the film prior to projection. The speed of rewinding is determined by operation of the drive sprocket driven through the gear clutch 188 which runs at the same speed as the clutch 91. Since, therefore, the time required for rewinding is substantially the same as the length of time required for projection, the rewinding will be completed while projection of the other film takes place. By reason of the fact that the same slip drive clutches are employed, the film will always be kept taut in the magazine while the rewind is taking place.

There has thereby been provided a magazine-loading device for a motion picture projector which is essentially self-contained in that all of the operating parts exclusive of the lens system and sound pickup system are housed within the magazine but which are so arranged that any number of magazines can be used with a projector without it being necessary to change the adjustment or position in any way of a stationarily mounted lens system and sound pickup device.

I claim:

1. In a moving picture projector including a stationary housing and power means exposed on each side thereof, the combination of interchangeable self-contained film magazines each comprising a casing including a reel for film to be projected and a reel for projected film rotatably mounted in the casing, a drive sprocket mounted within the casing and a projection aperture adjacent thereto, a releasable connection between the drive sprocket and a source of power on one side of the housing, and a clamp having elements located one on each side of the housing adapted to hold one magazine on one side of the housing for a projecting operation and the other magazine on the other side for a rewinding operation.

2. In a motion picture projector including a housing and a reel carrying magazine adapted to be used therewith the combination of a source of light in the housing, said housing having an aperture at the side thereof, and a lens mounted in the aperture, a cap for the aperture having a deflecting element and an opening at the side of the cap adapted to provide an exit for light from the deflecting element, said housing having a second aperture at the side thereof, an outwardly extending bonnet over the aperture, a light deflecting element in the bonnet for deflecting light from the housing and an outlet at the side of the bonnet for the light, said magazine having a projection aperture for the film, an opening in the side of the magazine adapted to receive the cap in a position behind the aperture and said magazine having a second projection aperture cooperating with a sound track on the film.

3. In a motion picture projector including a housing and a reel carrying magazine adapted to be used therewith the combination of a source of light in the housing, said housing having an aperture at the side thereof, a channel for light in the housing terminating at the aperture and a lens mounted in the channel, a cap for the aperture having a light deflecting element and an opening at the side of the cap adapted to provide an exit for light from the deflecting element, said housing having a second aperture at the side thereof, a channel for the light and an outwardly extending bonnet at the end of the channel, a light deflecting element in the bonnet for deflecting a beam of light from the housing and an outlet at the side of the bonnet for the beam of light, said magazine having a projection aperture and an opening in the side of the magazine adapted to receive the cap in a position behind the projection aperture and having a second projection aperture in register with a sound track on the film.

4. In a motion picture projector including a housing and a reel carrying magazine adapted to be used therewith the combination of a source of light in the housing, said housing having an aperture at the side thereof, a channel for light in the housing terminating at the aperture and a lens mounted in the outside end of the channel, a cap for the aperture surmounting the lens, a reflecting mirror mounted in the cap at a 45° angle relative to the axis of the channel and an opening at the side of the cap adapted to provide an exit for light from the mirror, said housing having a second aperture at the side thereof, a channel for the light and an outwardly extending bonnet at the end of the channel, a triangular prism mounted in the bonnet for directing a beam of light from the housing and an outlet at the side of the bonnet for the beam of light, said magazine having a projection aperture and a pressure gate adjacent thereto for holding a film in place, an opening in the side of the magazine adapted to receive the cap in a position behind the gate for directing light outwardly through the projection opening toward the gate, said magazine having a second projection aperture cooperating with a sound track on the film, a jacket secured in the casing adapted to receive the bonnet having an opening therein behind said last projection opening.

5. In a motion picture projector including a housing and a reel carrying magazine adapted to be used therewith the combination of a source of light in the housing, said housing having an aperture at the side thereof, a channel for light terminating at the aperture, a lens mounted in the outside end of the channel, a cap for the aperture surmounting the lens, a reflecting mirror mounted in the cap at a 45° angle relative to the axis of said channel, an opening at the side of the cap adapted to provide an exit for light from the mirror, said housing having a second aperture at the side thereof, a channel for the light and an outwardly extending bonnet at the end of the channel, a triangular prism mounted in the bonnet for directing a beam of light from the housing and an outlet at the side of the bonnet for the beam of light, said magazine having a projection aperture and a pressure gate adjacent thereto for holding a film in place, an opening in the side of the magazine adapted to receive the cap in a position behind the gate for directing light outwardly through the projection opening toward the gate, said magazine having a second projection aperture cooperating with a sound track on the film, a jacket secured in the casing adapted to receive the bonnet having an opening therein behind said last projection opening and clamping means for holding the magazine to the housing whereby said cap and said bonnet are retained in position in their respective openings.

6. In a motion picture projector a stationary housing including a source of power and a source of light, a lateral outlet for the light and a laterally extending shaft connected to the source of power, and a separate magazine adapted to be secured in place on the side of the housing, said magazine having an opening therein in register with the lateral outlet, a projection aperture and means for directing light from the housing through the aperture, a drive sprocket for the film and a gear clutch connecting the drive sprocket to the shaft for imparting rotational movement to the sprocket, said clutch having clutch members containing a predetermined number of interengaging elements, one of said clutch members being connected to the drive sprocket and one being connected to the shaft, said interengaging elements having an angular distance therebetween such that movement of the clutch a distance equal to said angular distance will correspond to movement of the film sufficient for passage of a complete frame of pictures, and a prism rotatably mounted on an axis parallel to the plane of the projection aperture having sets of parallel faces equal in number to one half the number of elements in one of said clutch members.

7. In a motion picture projector a stationary housing including a source of power and a source of light, a lateral outlet for the light and a laterally extending shaft connected to the source of power, and separate magazine adapted to be secured in place on the side of the housing, said magazine having an opening therein in register with the lateral outlet, a projection aperture and means for directing light from the housing through the aperture, a drive sprocket for the film and a gear clutch connecting the drive sprocket to the shaft for imparting continuous rotational movement to the sprocket, said clutch having clutch members containing a predetermined number of interengaging elements, one of said clutch members being connected to the drive sprocket and one being connected to the shaft, and a prism rotatably mounted on an axis parallel to the plane of the projection aperture having sets of parallel faces adapted to present said faces successively to the projection aperture to receive light therefrom, and a unitary set of gears between the shaft and the prism axis having a ratio whereby for every position of a flat prism face parallel to the projection aperture there is a frame of the film filling the projection aperture.

8. In a motion picture projector a stationary housing including a source of power and a source of light, a lateral outlet for the light and a laterally extending shaft connected to the source of power, and a separate magazine adapted to be secured in place on the side of the housing, said magazine having an opening therein in register with the lateral outlet, a projection aperture and means for directing light from the housing through the aperture, a drive sprocket for the film and a gear clutch connecting the drive sprocket to the shaft for imparting continuous rotational movement to the sprocket, said clutch having face contacting clutch discs each containing a predetermined number of interengaging teeth, one of said discs being connected to the drive sprocket and one being connected to the shaft, said teeth having an angular distance therebetween such that movement of the clutch a distance equal to said angular distance will correspond to movement of the film sufficient for passage of a complete frame of pictures, and a prism rotatably mounted on an axis parallel to the plane of the projection aperture having sets of parallel faces, said prism being adapted to present said faces successively to the projection aperture to receive light therefrom, and a unitary set of gears between the shaft and the prism axis having a ratio whereby for every position of a flat prism face parallel to the projection aperture there is a frame of the film filling the projection aperture.

9. In a motion picture projector a stationary housing including a source of power and a source of light, a lateral outlet for the light and a laterally extending shaft connected to the source of power, and separate magazine adapted to be secured in place on the side of the housing, said magazine having an opening therein in register with the lateral outlet, a projection aperture and means for directing light from the housing through the aperture, a drive sprocket for the film and a gear clutch connecting the drive sprocket to the shaft for imparting continuous rotational movement to the sprocket, said clutch having face contacting clutch discs each containing a predetermined number of interengaging teeth, one of said discs being connected to the drive sprocket and one being connected to the shaft, said teeth having an angular distance therebetween such that movement of the clutch a distance equal to said angular distance will correspond to movement of the film sufficient for passage of a complete frame of pictures, and a prism rotatably mounted on an axis parallel to the plane of the projection aperture having sets of parallel faces equal in number to one half the number of elements on one of said clutch discs, said prism being adapted to present said faces successively to the projection aperture to receive light therefrom, and a unitary set of gears between the shaft and the prism axis having a ratio whereby for every position of a flat prism face parallel to the projection aperture there is a frame of the film filling the projection aperture.

10. In a motion picture projector a stationary housing including a source of power and a source of light, a lateral outlet for the light and a laterally extending shaft connected to the source of power, and a separate magazine adapted to be secured in place on the side of the housing, said magazine having an opening therein in register with the lateral outlet, a projection aperture and means for directing light from the housing through the aperture, a drive sprocket for the film and a gear clutch connecting the drive sprocket to the shaft for imparting continuous rotational movement to the sprocket, said clutch having face contacting clutch discs each containing a set of twelve interengaging teeth, one of said discs being connected to the drive sprocket and one being connected to the shaft, said teeth having an angular distance therebetween such that movement of the clutch a distance equal to said angular distance will correspond to movement of the film sufficient for passage of a complete frame of pictures, and a prism rotatably mounted on an axis parallel to the plane of the projection aperture having six sets of parallel faces adapted to present said faces successively to the projection aperture to receive light therefrom, and a unitary set of gears between the shaft and the prism axis having a ratio whereby for every position of a flat prism face parallel to the projection aperture there is a frame of the film filling the projection aperture.

11. A motion picture projector having the film reels thereof mounted in a magazine comprising a stationary mounting, a lens system on the mounting, a sound pickup and amplifying system on the mounting, and a pair of magazine casings having an attached position one on each side of the casing, film reels and a drive sprocket in each said casing having shafts extending therefrom and releasable connections between said shafts and the source of power when the casing is in attached position upon the mounting, said casing having openings facing the mounting respectively adapted to receive light for film reproduction and light for sound reproduction from the mounting.

12. A motion picture projector having the film reels thereof mounted in a magazine comprising a stationary housing, light generating means in the housing, a source of power and a lens system mounted on the housing, a sound pickup and amplifying system attached to the housing, and a pair of magazine casings adapted to be attached one on each side of the casing, film reels and a drive sprocket in each said casing having shafts extending therefrom and automatically releasable connections between said shafts and the source of power when the casing is mounted upon the housing and a retainer for holding the casing upon and releasing it from the housing, said casing having openings facing the housing respectively adapted to receive light for film reproduction and light for sound reproduction from the housing for projection respectively into the lens system and the sound system.

13. A motion picture projector having the film reels thereof mounted in a magazine comprising a stationary housing, a fan, light generating means in the housing, a source of power and a focusing and magnifying lens system mounted on the housing, a cabinet beneath the housing having a sound amplifying system therein and a sound wave pickup mounted on the cabinet, and a pair of magazine casings adapted to be attached one on each side of the housing, film reels and a drive sprocket in each said casing having shafts extending therefrom and friction connections between said shafts and the source of power when the casing is mounted upon the housing and a retainer for holding the casing upon and releasing it from the housing, said casing having openings facing the housing respectively adapted to receive light for film reproduction and light for sound reproduction from the housing for projection respectively into the lens system and the sound pickup system.

14. A motion picture projector having the film reels thereof mounted in a magazine comprising a stationary housing, a fan, light generating means in the housing, a source of power and a focusing and magnifying lens system mounted on the housing, a cabinet beneath the housing having a sound amplifying system therein and a sound wave pickup mounted on the cabinet, a pair of magazine casings comprising relatively flat containers adapted to be attached one on each side of the housing, film reels and a drive sprocket in each said casing having shafts extending therefrom and surface connections between said shafts and the source of power when the casing is mounted upon the housing and a retainer for holding the casing upon and releasing it from the housing, said casing having a pair of openings facing the housing, one of said openings being adapted to receive light for film reproduction and the other being adapted to receive light for sound reproduction from the housing for projection respectively into the lens system and the sound pickup system.

15. In a motion picture projector including a stationary housing, a light source, a power source and projecting elements, the combination of interchangeable, self-contained, film magazines, each comprising a casing including a reel for film to be projected and a reel for projected film rotatably mounted in the casing, a drive sprocket mounted within the casing and a projection aperture adjacent thereto, a releasable connection for connecting the drive sprocket to the source of power on one side of the housing, a slip drive between the reels and the source of power on the same side of the housing, a clutch element on the opposite side of the housing connected to the source of power adapted to rotate a drive sprocket, a slip drive for the reels on the opposite side of the casing connected to the same source of power, and a pair of clamps located one on each side of the housing having a position against the respective magazines adapted to hold one magazine to the housing on one side for a projecting operation and another magazine to the housing on the other side for a rewinding operation.

16. In a motion picture projector including a stationary housing, a light source, a power source and projecting elements, the combination of: interchangeable, self-contained film magazines, each comprising a casing including a reel for film to be projected and a reel for projected film rotatably mounted one on each end of the casing, a drive sprocket mounted within the casing and a projection aperture adjacent thereto, a clutch for releasably connecting the drive sprocket to the source of power on one side of the housing, a slip drive between the reels and the source of power on the same side of the housing, a clutch element on the opposite side of the housing connected to the source of power adapted to rotate a drive sprocket, a slip drive for the reels on the opposite side of the casing connected to the same source of power and a pair of spring clamps having arms located one on each side of the housing having a position against each respective magazine adapted to hold simultaneously one magazine to the housing on one side for a projecting operation and another magazine to the housing on the other side in inverted position for a rewinding operation.

RICHARD JONES.

REFERENCES CITED

The following references are of record in the file of this patent:

UNITED STATES PATENTS

| Number | Name | Date |
|---|---|---|
| 1,215,364 | Gilmore | Feb. 13, 1917 |
| 1,245,755 | Mehfelder | Nov. 6, 1917 |
| 1,713,503 | VonMadaler | May 14, 1929 |
| 1,760,219 | Thornton | May 27, 1930 |
| 1,760,220 | Thornton | May 27, 1930 |
| 1,843,650 | Schlicker | Feb. 2, 1932 |
| 1,935,572 | Leventhal | Nov. 14, 1933 |
| 2,023,581 | Glunt | Dec. 10, 1935 |
| 2,026,984 | Lyman | Jan. 7, 1936 |
| 2,046,723 | Brownscombe | July 7, 1936 |
| 2,126,299 | Wittel et al. | Aug. 9, 1938 |
| 2,211,358 | Wittel | Aug. 13, 1940 |
| 2,213,768 | Merriman et al. | Sept. 3, 1940 |
| 2,214,468 | Lannerd | Sept. 10, 1940 |
| 2,217,183 | Ross | Oct. 8, 1940 |
| 2,238,719 | DeTartas | Apr. 15, 1941 |
| 2,322,369 | Lackoff et al. | June 22, 1943 |
| 2,342,509 | Gaty et al. | Feb. 22, 1944 |
| 2,362,019 | Moore | Nov. 7, 1944 |

FOREIGN PATENTS

| Number | Country | Date |
|---|---|---|
| 746,448 | France | Mar. 7, 1933 |